(12) United States Patent
O'Dell et al.

US007867555B2

(10) Patent No.: US 7,867,555 B2
(45) Date of Patent: Jan. 11, 2011

(54) DISPERSION-COATED POWDER COLORING SYSTEM

(75) Inventors: William G. O'Dell, Lawson, MO (US); Steven D. Johnson, Prairie Village, KS (US); Larry B. Brandenburger, Lino Lakes, MN (US)

(73) Assignee: Valspar Sourcing Inc., Minneapolis, MN (US)

( * ) Notice: Subject to any disclaimer, the term of this patent is extended or adjusted under 35 U.S.C. 154(b) by 0 days.

(21) Appl. No.: 10/778,895

(22) Filed: Feb. 13, 2004

(65) Prior Publication Data

US 2005/0182155 A1 Aug. 18, 2005

(51) Int. Cl.
| | |
|---|---|
| B01F 17/00 | (2006.01) |
| B05D 3/00 | (2006.01) |
| B05D 3/02 | (2006.01) |
| B60C 1/00 | (2006.01) |
| C04B 9/02 | (2006.01) |
| C08C 1/08 | (2006.01) |
| C08G 18/42 | (2006.01) |
| C08J 3/02 | (2006.01) |
| C08J 3/09 | (2006.01) |
| C08K 3/04 | (2006.01) |
| C08K 3/18 | (2006.01) |
| C08K 3/22 | (2006.01) |
| C08K 5/23 | (2006.01) |
| C08K 5/34 | (2006.01) |
| C08K 5/48 | (2006.01) |
| C08K 7/00 | (2006.01) |
| C08K 9/00 | (2006.01) |
| C08L 67/00 | (2006.01) |
| C08L 83/00 | (2006.01) |
| C09B 67/00 | (2006.01) |
| C09D 5/03 | (2006.01) |
| C09D 151/00 | (2006.01) |

(52) U.S. Cl. .................. 427/195; 106/14.41; 106/14.44; 427/372.2; 427/385.5; 523/200; 523/201; 523/205; 523/220; 523/221; 523/333; 523/335; 523/339; 524/88; 524/190; 524/431; 524/496; 524/497; 524/500; 524/601; 524/904

(58) Field of Classification Search .................. 524/88, 524/190, 431, 496, 497, 500, 601, 904; 523/200, 523/201, 205, 220, 221, 335, 333, 339; 106/14.41, 106/14.44; 427/195, 372.2, 385.5
See application file for complete search history.

(56) References Cited

U.S. PATENT DOCUMENTS

| | | | |
|---|---|---|---|
| 3,843,571 A | 10/1974 | Fitzgerald | |
| 3,867,480 A | 2/1975 | Fujiyoshi et al. | |
| RE28,361 E | 3/1975 | Hahn | |
| 3,909,282 A | 9/1975 | Gray | |
| 3,939,114 A | 2/1976 | Camelon et al. | |
| 3,941,904 A | 3/1976 | Hoh et al. | |
| 3,972,844 A | 8/1976 | Morosawa et al. | |
| 3,980,607 A | 9/1976 | Johannes | |
| 3,998,768 A * | 12/1976 | Pettit, Jr. ...................... | 524/38 |
| 4,112,214 A * | 9/1978 | Tsou ........................... | 528/494 |
| 4,138,511 A | 2/1979 | Rolles et al. | |
| 4,169,737 A | 10/1979 | Burke, Jr. et al. | |
| 4,200,566 A | 4/1980 | FitzGerald et al. | |
| 4,242,253 A | 12/1980 | Yallourakis | |
| 4,260,066 A | 4/1981 | Hannon et al. | |
| 4,268,549 A | 5/1981 | Fink et al. | |
| 4,312,795 A | 1/1982 | Taguchi et al. | |
| 4,320,048 A * | 3/1982 | Harmuth ...................... | 523/333 |
| 4,543,313 A | 9/1985 | Mahabadi et al. | |
| 5,034,432 A * | 7/1991 | Ueno et al. .................. | 523/221 |
| 5,196,471 A | 3/1993 | Rangaswamy et al. | |
| 5,319,001 A | 6/1994 | Morgan et al. | |
| 5,324,787 A * | 6/1994 | Pinschmidt et al. ....... | 525/328.2 |
| 5,470,893 A | 11/1995 | Sinclair-Day et al. | |
| 5,571,454 A * | 11/1996 | Chen et al. .................. | 252/500 |
| 5,837,049 A | 11/1998 | Watson et al. ............... | 106/427 |
| 5,856,378 A * | 1/1999 | Ring et al. .................. | 523/205 |
| 5,908,877 A * | 6/1999 | Ci et al. ...................... | 523/201 |
| 5,955,530 A * | 9/1999 | Inoue et al. .................. | 524/493 |
| 6,020,403 A * | 2/2000 | Eck et al. ..................... | 523/340 |
| 6,063,855 A * | 5/2000 | Pecsok et al. ............... | 524/520 |
| 6,133,344 A | 10/2000 | Blatter et al. | |
| 6,146,145 A | 11/2000 | Itakura et al. | |
| 6,184,311 B1 * | 2/2001 | O'Keeffe et al. ............ | 525/438 |
| 6,203,768 B1 * | 3/2001 | McCormick et al. ........... | 423/1 |
| 6,284,846 B1 * | 9/2001 | Ambrose et al. ............ | 525/440 |

(Continued)

FOREIGN PATENT DOCUMENTS

DE 2 147 653 4/1973

(Continued)

OTHER PUBLICATIONS

English Translation of JP 47-27778 A (1972).*

(Continued)

Primary Examiner—Patrick D Niland
(74) Attorney, Agent, or Firm—Shumaker & Sieffert, P.A.

(57) ABSTRACT

A method for coloring powders using a stable colorant dispersion is provided. The method includes mixing a base powder and a stable colorant dispersion. A colored powder composition baying a core particle and a partial shell about the core particle is provided.

12 Claims, No Drawings

U.S. PATENT DOCUMENTS

| | | | |
|---|---|---|---|
| 6,360,974 B1 * | 3/2002 | Sacharski et al. | 241/16 |
| 6,663,960 B1 * | 12/2003 | Murakami et al. | 428/402 |
| 6,802,641 B2 | 10/2004 | Ladatto et al. | |
| 2002/0128348 A1 * | 9/2002 | Palmer | 523/160 |
| 2002/0142241 A1 * | 10/2002 | Palmer | 430/110.2 |
| 2003/0021983 A1 * | 1/2003 | Nohr et al. | 428/327 |
| 2003/0181570 A1 | 9/2003 | Ladatto | |
| 2003/0191230 A1 | 10/2003 | Ladatto | |
| 2004/0151940 A1 * | 8/2004 | Takano et al. | 428/650 |
| 2005/0124756 A1 * | 6/2005 | Miller et al. | 524/557 |
| 2005/0182155 A1 | 8/2005 | O'Dell et al. | |
| 2006/0106134 A1 | 5/2006 | Ladatto et al. | |

FOREIGN PATENT DOCUMENTS

| | | |
|---|---|---|
| DE | 2 549 406 | 5/1976 |
| EP | 0 250 183 | 12/1987 |
| EP | 0 312 331 | 4/1989 |
| EP | 0 372 860 | 6/1990 |
| EP | 0 372 958 | 6/1990 |
| EP | 0 389 080 | 9/1990 |
| EP | 1 323 769 A2 | 7/2003 |
| EP | 1323769 A2 * | 7/2003 |
| FR | 2 190 874 | 2/1974 |
| FR | 2 245 744 | 4/1975 |
| FR | 2 310 394 | 12/1976 |
| GB | 1 377 780 | 12/1974 |
| GB | 1 383 602 | 2/1975 |
| GB | 1 387 791 | 3/1975 |
| GB | 1 485 388 | 9/1977 |
| GB | 1 512 495 | 6/1978 |
| GB | 2 026 506 | 2/1980 |
| GB | 2 226 824 | 7/1990 |
| JP | 72027778 B * | 7/1972 |
| JP | 48 7686 | 4/1973 |
| JP | 48 7492 | 7/1973 |
| WO | WO 91/01798 | 2/1991 |
| WO | WO 99/18161 * | 4/1999 |
| WO | WO 02/42384 A1 | 5/2002 |
| WO | WO 02/094950 A1 * | 11/2002 |
| WO | WO 2004/011531 | 2/2004 |

OTHER PUBLICATIONS

English Translation of JP 61-221234 A (1986).*
MachineTranslation of EP 1323769 A2, Etzrodt et al., Jul. 2003.*
Greenhalgh, *Metallic Powder Coatings*, Polymers Paint and Colour Journal, 169(4008):920, Sep. 19, 1979.
Carter, *Ten Years of Bonded Metallic Powder Coatings*, Polymer Paint & Colour Journal, 176(4179):866-868, Nov. 12, 1986.
Bine, *Metallic Powder Coatings*, Thermoset Powder Coatings, ed. J. Ward, FMJ International Publications Ltd., 161(4008):26-28, 1989.
http://www.diffusion-polymers.com/Liquid%20Diffusion.htm, "Diffusion in Polymers Platform: Liquid Diffusion," 2 pages, printed from the internet on Jan. 27, 2004.
http://www.saf.com/rightfinish.html, "How to Decide Between Anodizing, Painting, and Powder Coating," 8 pages, printed from the internet on Mar. 23, 2004.
Examiner's First Report from corresponding Australian patent application No. 2005214335, dated Apr. 10, 2007, (2 pages).
Notification of Transmittal of the International Preliminary Report on Patentability for related patent No. PCT/US2006/040831, mailed Feb. 1, 2008, 20 pages.
First Examiner's Report from corresponding patent application No. EP 05 713 323.3-2102, dated Jan. 11, 2007, (5 pages).
First Examiner's Report for corresponding Canadian patent application No. 2,626,393, dated Sep. 22, 2009, 4 pages.

* cited by examiner

DISPERSION-COATED POWDER COLORING SYSTEM

TECHNICAL FIELD

This invention relates to powder compositions and methods for their manufacture and use.

BACKGROUND

Powder coatings are an alternative to traditional liquid based coatings and paints. Liquid based systems are fairly easy to tint and color to produce a desired color. However, this has not been generally true of powder-based systems due to the manufacturing process as well as the application process for powders.

Powder coatings are generally manufactured in a multi-step process. Various ingredients, which may include resins, curing agents, pigments, additives, and fillers, are dry-blended to form a premix. This premix is then fed into an extruder, which uses a combination of heat, pressure, and shear to melt and thoroughly mix the ingredients. As the ingredients mix together in melted form during the extrusion process, various colors of pigments can be mixed together to produce a uniform color. The extrudate is cooled and then ground into a powder. Depending on the desired coating end use, the grinding conditions are typically adjusted to achieve a powder median particle size of about 25-150 microns.

The final powder may then be applied to an article by various means including the use of fluid beds and spray applicators. Most commonly, an electrostatic spraying process is used, wherein the particles are electrostatically charged and sprayed onto an article that has been grounded so that the powder particles are attracted to and cling to the article. After coating, the article is heated. This heating step causes the powder particles to melt and flow together to coat the article. Optionally, continued or additional heating may be used to cure the coating. Other alternatives such as UV curing of the coating have been discovered and may be used.

A characteristic and limitation of powder coatings that is different from liquid paints is that when powder coatings of two different colors are blended together, the resultant finish typically has a speckled appearance rather than being uniform in color. For example, if a white powder coating is mixed with, or contaminated with, a black powder coating and then applied, the final coating will have a black and white speckled appearance, instead of having a uniform gray color finish.

This characteristic of powder coatings has important implications in the economics of powder coatings manufacture, as each powder composition must be separated from other powder compositions. However, it is difficult to quickly and inexpensively change from one powder coating composition color to another. Changing compositions requires complete separation of product from one batch of colored powder to the next at all stages of manufacturing. At the extruder, this typically requires a complete purge of the equipment, and then feeding the next composition until it stabilizes. This takes time and results in waste product. At the grinder, the entire grinding system must be cleaned. This typically requires major disassembly and cleaning of all grinding equipment and associated ductwork, and then reassembly, which is a time and labor intensive endeavor. Failure to fully clean the equipment will result in the second powder color composition having specks of the first color composition in it.

The cleaning process for switching from production of one color to another is particularly onerous in the production of small batches of special colors. For small batches, it is not uncommon for the cleaning process to consume more time and labor than was required to extrude and grind the batch.

A related problem occurs when a customer requests a custom color powder coating. If the color initially produced does not match the requested color, then it must be re-fed into the extruder with additional pigment or material. This requires the whole process, including clean up, to be repeated. Alternatively, the batch may be discarded and an entirely new batch run to obtain the proper color match.

For all of these reasons, it is difficult, time consuming, and expensive to produce small amounts of any particular powder coating color. It is greatly preferred to produce large amounts of the same color, with minimal changeovers. However, due to the overall advantages of powder coatings, there is a growing acceptance of powder coatings. This is turn has lead to a greater demand for a wider variety of colors for an increasing array of applications.

SUMMARY

In one aspect, the invention allows the rapid and cost-effective creation of an almost endless variety of powder coating compositions. This is accomplished by enabling the mixing of color and other desired additives into a powder. A further benefit is that this allows different process steps to be run most efficiently and effectively. Another benefit is that the number of intermediate materials can be minimized while maximizing the array of finished products available. This provides for an efficient manufacturing process that minimizes costs associated with inventory and cleanup.

In another aspect, a method is provided which includes providing at least one base powder, providing at least one stable colorant dispersion, and mixing the base powder(s) and the colorant dispersion(s) to form a colored mixture. In a preferred embodiment, treating the mixture yields a free flowing colored powder.

Another aspect of the invention is a method that includes providing at least one base powder, and providing at least one colorant dispersion, where each dispersion includes: at least one of a pigment and a dye, a carrier, and a dispersing aid; or a dye solution, including a dye and a carrier; and mixing the base powder(s) and the colorant dispersion(s) to form a colored mixture.

Another aspect of the invention is a method that includes providing at least one powder, providing at least one stable colorant dispersion, where the colorant dispersion includes at least one of a pigment and a dye in a carrier, and mixing the base powder and the colorant dispersion to form a colored mixture, where the mixture includes a film-forming polymer.

Another aspect of the invention is a method of powder coating that includes providing at least one base powder, providing at least one stable colorant dispersion, mixing the base powder(s) and the stable colorant dispersion(s) to form a colored powder, treating the mixture to form a free flowing colored powder, applying the colored powder to a substrate, and heating the colored powder to form a powder coating on the substrate.

Another aspect of the invention is a composition that includes a core particle, and at least a partial shell about the core particle, where the shell includes a dye or a pigment particle and a dispersing aid.

The details of one or more embodiments and aspects of the invention are set forth below. Other features, objects, and advantages of the invention will be apparent from the description and from the claims.

DETAILED DESCRIPTION

In one aspect, a method is provided which includes providing at least one base powder, providing at least one stable colorant dispersion, and mixing the base powder(s) and the colorant dispersion(s) to form a colored mixture. In a preferred embodiment, treating the mixture yields a free flowing colored powder.

Suitable base powders for use generally include at least one polymeric binder. They may also optionally include one or more colorants, and optionally include one or more other additives. These ingredients are combined and mixed prior to being fed into an extruder.

Suitable polymeric binders generally include a film forming resin and optionally a curing agent for the resin. The binder may be selected from any resin or combination of resins that provides the desired film properties. Suitable examples of polymeric binders include thermoset and/or thermoplastic materials, and can be made with epoxy, polyester, polyurethane, polyamide, acrylic, polyvinylchloride, nylon, fluoropolymer, silicone, other resins, or combinations thereof. Examples of preferred binders include the following: carboxyl-functional polyester resins cured with epoxide-functional compounds such as triglycidylisocyanurate (TGIC), carboxyl-functional polyester resins cured with polymeric epoxy resins, carboxyl-functional polyester resins cured with hydroxyalkyl amides, hydroxyl-functional polyester resins cured with blocked isocyanates or uretdiones, epoxy resins cured with amines such as dicyandiamide, epoxy resins cured with phenolic-functional resins, epoxy resins cured with carboxyl-functional curatives, carboxyl-functional acrylic resins cured with polymeric epoxy resins, hydroxyl-functional acrylic resins cured with blocked isocyanates or uretdiones, unsaturated resins curing through free radical reactions, and silicone resins used either as the sole binder or in combination with organic resins. The optional curing reaction may be induced thermally, or by exposure to radiation (for example UV, UV-Vis, Visible light, IR, near IR, and E-beam).

The final base powder may be clear or colored, translucent or opaque. Clear base powders have no colorants added, and are useful for dark colors and for metallic or pearlescent finishes. Both dyes and pigments may be used as colorants. Colored base powders contain a sufficient quantity of pigments or dyes to induce some degree of opacity, and are useful for colors in which a substantial portion of the required pigmentation is already included in the base powder. While a wide variety of dry pigments can be utilized for the pigmented base powder, the most common and widely used is titanium dioxide white.

The base powder may optionally include other additives. These other additives can improve the application of the powder coating, the melting and/or curing of that coating, or the performance or appearance of the final coating. Examples of optional additives which may be useful in the base powder include: cure catalysts, antioxidants, color stabilizers, slip and mar additives, UV absorbers, hindered amine light stabilizers, photoinitiators, conductivity additives, tribocharging additives, anti-corrosion additives, fillers, inert pigments, texture agents, degassing additives, flow control agents, thixotropes, and edge coverage additives.

The polymeric binder is dry mixed together with any optional additives, and then is typically fed through an extruder. The resulting extrudate is then ground to form a powder. Other methods may also be used. For example, one alternative method uses a binder that is soluble in liquid carbon dioxide. In that method, the dry ingredients are mixed into the liquid carbon dioxide and then sprayed to form the base powder particles.

The resulting powder is at a size that can effectively be used by the application process. Practically, particles less than ten microns in size are very difficult to apply effectively using conventional electrostatic spraying methods. For smooth finishes, particles up to 150 microns in size, with a median particle size of 45 microns is preferred. For textured finishes, particles up to 300 microns in size, with a median particle size of 60 microns is preferred.

Suitable base powders may be made, or alternatively may be obtained from various suppliers including Valspar, Akzo Nobel, Rohm & Haas, Sherwin Williams and H.B. Fuller.

Colorant dispersions include pigment dispersions, dye solutions, and combinations thereof. Suitable colorant dispersions include a solid dye, a dye solution, a dye solution with a dispersing aid, pigments in a dispersing aid in solid form, a pigment and dispersing aid in a carrier, and a pigment and a dye and a dispersing aid in a carrier.

In dry form, most pigments are highly agglomerated, consisting of clusters of primary particles that are bound together by physical forces. In order to create a stable pigment dispersion, the dry pigment is typically combined with a dispersing aid and a carrier. Mechanical energy is then applied to the mixture in order to overcome the forces binding the pigment agglomerates together. The resulting stable pigment dispersion would then consist of individual pigment particles that are encapsulated within the dispersing aid, suspended in the carrier media. These pigment particles are ideally thus reduced to their primary particle size, as opposed to the highly agglomerated state of the raw dry pigment.

Various organic or inorganic pigments may be used. Suitable pigments include titanium dioxide, carbon black, red iron oxide, yellow iron oxide, raw umber, phthalocyanine blue, phthalocyanine green, napthol red, toluidine red, various organic yellows, carbazole violet, and quinacridones. Essentially any colored pigment that has utility for use in powders in dry form could also be considered for use in a colorant dispersion. A representative list of pigments used in commercially available colorant dispersions can be found in the product literature describing the Covon™ Colorants marketed by Degussa.

The median pigment particle size is suitably about 0.01 to 4.0 microns, and preferably about 0.04 to 1.0 microns. Organic pigments typically have a median particle size of less than 0.3 microns. Titanium dioxide pigments generally have a median particle size of 0.3 to 0.5 microns. Iron oxide pigments typically have a median particle size of 0.2 to 0.6 microns. Carbon black has a median particle size around 0.07 microns, while phthalocyanine blue typically has a median particle size around 0.05 microns.

Alternatively, the colorant dispersion may include a dye in a carrier instead of a pigment dispersion. A dye is a colorant that is soluble in the carrier liquid, and hence dissolved in the carrier. Suitable dyes may be purchased from various suppliers including Sandoz and Ciba Specialty Chemicals. Additionally, the colorant dispersion may include some combination of pigments, dyes, and dispersing aids.

Suitable carriers for use in the present invention include, for example, water, organic solvents, or combinations thereof. In preferred embodiments the carrier is selected so as to prevent or minimize undesirable melting or softening of the components of the base powder. Some examples of suitable carriers include water, aliphatic solvents such as Mineral spirits, VM&P Naphtha, hexane, heptane, and octane. The preferred carrier liquid includes water, and water is most preferred. An aqueous carrier is preferred for ease of handling, reduced flammability and exposure concerns for workers, and reduced impact on the environment.

Suitable pigment dispersions preferably include a dispersing aid. This dispersing aid can be selected from any material that maintains the stability of the dispersion for an extended time. Suitable dispersing aids include one or more resins, polymers, monomers, oligomers, or surfactants. The dispersing aid is typically a surfactant or polymer soluble in the carrier that maintains the stability of the dispersion. Some useful dispersing aids include sodium lauryl sulfate, acrylic amines, acrylic carboxylates, acrylic polymers, alkylphenol ethoxylates, and alkylphenol propoxylates. Dye solutions may also include a dispersing aid.

The colorant used in the stable colorant dispersion may be selected from pigments, dyes or combinations thereof. The colorant dispersion can be any hue or color. It may be clear, transparent, translucent, or opaque. The dispersion may be a liquid, slurry, gel, paste, or solid, though liquids are generally preferred for ease of measurement and handling. The colorant dispersion can be made prior to mixing with the base powder, or may be purchased from a variety of commercial suppliers. Pigments in solid pre-dispersed form are available from Sun Chemical under the tradename Surpass Specialty Paint Flush™, Ciba Specialty Chemicals under the tradename Microlean-UA™, and others. Solid pre-dispersed pigments may also be mixed with a suitable carrier and used as a liquid colorant dispersion. Suitable commercially available liquid pigment dispersions are available from various suppliers including The Valspar Corporation (through its subsidiary EPS/CCA) under the trade designation Novacolor™, and from DeGussa Corp, under the trade designation Covon™ or Aquatrend™. A colorant dispersion in paste form is available from Penn Color under the tradename Aquacolor™.

Suitable liquid colorant dispersions include about 4 to 80% by weight pigments, 3 to 30% by weight dispersing aid, with the remainder carrier. Preferably, the dispersion includes 5 to 70% by weight pigments, 5 to 25% by weight dispersing aid, with the remainder carrier. More preferably, the dispersion includes 5 to 70% by weight pigments, 7 to 22% by weight dispersing aid, with the remainder carrier.

The colorant dispersion is essentially stable in that the pigment or dye is uniformly dispersed throughout. Settling occurs at a very slow rate such that the dispersion remains essentially homogeneous for extended periods of time, preferably at least 4 hours, and more preferably 24 hours or longer. The colorant dispersion avoids agglomeration of the pigment particles, and there is no irreversible settling or particle coagulation over periods as long as long as six months and preferably up to a year or longer. Following this extended period of storage, the colorant dispersion may be gently mixed, stirred, or gently shaken to restore the dispersion to uniform consistency.

A resultant feature of the colorant dispersion is reproducible coloring strength. This stability enables the dispersion to be pre-mixed and dispensed by either weight or volume. This feature allows reliable and reproducible standards to be prepared for use in computerized color matching, and results in predictable, consistently colored powder compositions. A predictable amount of pigment can be introduced into the process by using a measurable volume of the colorant dispersion. Alternatively, the dispersion may be measured by weight, or by any other system such as using time and flow rate, or any other static or process measuring system.

Optionally, other additives may be used in the present invention. As discussed above, these optional additives may be added prior to extrusion and be part of the base powder, or may be added post extrusion. Suitable additives for addition after extrusion include materials that would not perform well if they were added prior to extrusion, materials that would cause additional wear on the extrusion equipment, or other additives. Additionally, optional additives include materials which are feasible to add during the extrusion process, but which are found desirable to add later. The additives may be added alone or in combination with other additives to provide a desired effect on the powder finish or the powder composition. These other additives can improve the application of the powder, the melting and/or curing, or the final performance or appearance. Examples of optional additives which may be useful include: cure catalysts, antioxidants, color stabilizers, slip and mar additives, UV absorbers, hindered amine light stabilizers, photoinitiators, conductivity additives, tribocharging additives, anti-corrosion additives, fillers, inert pigments, texture agents, degassing additives, flow control agents, thixotropes, and edge coverage additives.

Other preferred additives for incorporation at this step include metallic effect pigments, such as dry aluminum flakes, pearlescent pigments, micas, and bronze pigments. The most preferred grades of aluminum and bronze pigments for incorporation by this process include grades which are highly surface treated, including grades specifically designed for use in powder coatings or in aqueous liquid coating applications. Some suppliers of these materials include MD-Both and Eckart.

Other preferred additives include performance additives such as rubberizers, friction reducers, and microcapsules. Additionally, the additive could be an abrasive, a catalyst, heat sensitive, or one that helps create a porous final coating. Also, additives to improve wetting of the base powder may be added.

One or more base powders, one or more colorant dispersions, and any optional additives are mixed. Additional liquid of any suitable type may also be added during mixing. If used, this additional liquid is preferably water. Mixing can be carried out by any available mechanical mixer or by manual mixing. Some examples of possible mixers include Henschel mixers, Mixaco mixers, and horizontal shaft mixers. Preferred mixers would include those that are most easily cleaned. A change-can style of mixer, or mixing in the actual shipping container is most preferred.

The mixing step is preferably performed at less than 40° C., and even more preferably at less than 30° C., and under gentle conditions. Because a colorant dispersion is used, heat and high shear are neither necessary nor desired in mixing. The colorant dispersion, any optional additives and the base powders should be mixed together to produce a sufficiently uniform mixture. Typically, the components are stirred together in a blender or Henschel mixer for less than 1 minute to provide the requisite mixing. Ideally, regardless of the particular mixing device utilized, the mixing time and rpm should be chosen such that there is only minimal change in particle size. The objective of the mixing step is to coat the base powder particles with colorant, not to cause significant particle size changes. The resulting mixture may have a variety of appearances. It may remain in a mostly solid form, having the consistency of wet sand, or may be a thick slurry, or may even be liquid. The physical form of the product at the time of mixing will largely be determined by the ratios of colorant, carrier, additional added liquid and base powders used.

After mixing, the carrier may be removed from the powder. The desired end product is a free-flowing powder. Removal of the carrier includes changing the state of the carrier, reacting the carrier, evaporating the carrier, or other methods. Preferably, the powder is dried. Like mixing, drying will generally take place under gentle conditions, and at a temperature preferably less than 40° C., and even more preferably at less than 30° C. In all cases, drying should occur well below the softening point of the base powder. The softening point of the base powder is the point at which the surface of the powder particles heat to the point that the particle becomes tacky and sticky.

In one embodiment, the material may be left to dry in an open container. More preferably, the material will be spread out, or otherwise more fully exposed for drying. Optionally, dry air or another gas may be blown across or through the material to speed the drying process. Alternatively, some level of vacuum may be used to speed the drying process. In another embodiment, drying is accomplished by means of a fluidized bed. The use of fluidizing air to accelerate the drying process can be done either in a separate process vessel or in the mixing vessel. In another embodiment, the mixing and drying steps can be performed in a disposable shipping container. In general, the wetter the intermediate mixture, the longer it will take to dry. As the material dries, it becomes more free flowing. A discussion on free flowability and a general definition may be found in Powder Coating Institute Technical Brief #24.

If clumping is present after removal of the carrier, sieving, milling, ball milling, air blowers, shaking, or other methods may remove the clumps. Preferably, sieving will be used. The sieve to be used will have a desired mesh or pore size depending on the desired powder attributes. Typically, for smooth finishes, the sieve will have a mesh size between about 75 microns and about 150 microns. Larger mesh sizes, such as up to 300 microns may be preferred for some textured finishes.

When a sieve is utilized, the dried material will be passed through the sieve, which will keep any clumps of material from passing onto the final product. These may be soft non-fully dried clumps of material, or hard clumps of particles. Sieving allows the process to continue without requiring that all of the mixture be uniformly dried, and also helps maintain a consistent final product. Sieving further enables the drying step to be optimized from a process perspective.

One illustrative method of the present invention is to select one or more base powders and one or more stable colorant dispersions. The stable colorant dispersion is added to the base powders by pouring, spraying, or any manual, mechanical or automatic means. Other optional additives may be added. This can be poured, sprayed, or added by any manual, mechanical or automatic means. These optional additives can be combined with the base powder before or after addition of the colorant dispersion, or can be premixed with the colorant prior to addition of the colorant dispersion. Additional liquid, which may or may not be the same as any carrier used for the stable colorant dispersion, may be added. For example, a small amount of water may be added to improve mixing. This can be poured, sprayed, or added by any manual, mechanical or automatic means. The base powder plus any additions are mixed or allowed to become uniformly distributed. In certain embodiments, the mixing can occur at the same time as any additions are made, which may obviate the need for additional or separate mixing and will provide the required level of uniformity to the mixture. After mixing, the material may be dried, and may be passed through a sieve.

In a preferred embodiment, the stable colorant dispersion includes a pigment and a dispersing aid. In such a dispersion, the dispersing aid surrounds the pigment particles, which keeps the pigment particles from coalescing. In typical formulations, after the stable colorant dispersion is mixed with the base powder, there are many more pigment particles than base powder particles. As the carrier is removed, the surrounded pigment particles have a tendency to attach to the base powder particles. As many pigment particles stick to each base powder particle, this begins to form at least a partial layer, more preferably a substantially complete layer, of colorant on the surface of the core particle. This forms a partial or full shell-like structure(though it is recognized that the "shell-like structure" will not necessarily be a continuous layer, but may be a discontinuous layer of discrete particles or islands of colored particles).

While not wishing to be bound by any theory, presently available evidence indicates that once the colorant dispersion is added to the base powder, the colorants in the colorant dispersion form a coating layer on the surface of the base powder particles. It is believed that the other components in the colorant dispersion loosely associate the pigment particles with the base powder particles. Presently available evidence indicates that the number of pigment particles typically associated with each core base particle varies depending on the size of the base particle, size of the pigment/dye particle, and the amount of pigment/dye used. This can be seen on the following table, which uses a base particle size of 32 microns in diameter for calculations.

| Pigment | Average pigment particle diameter, microns | Exemplary pigment usage level (wt % of powder coating) | Relative number of pigment particles per base particle |
| --- | --- | --- | --- |
| Titanium Dioxide | 0.3 | 3.5% | 15,700 |
| Red Iron Oxide | 0.2 | 2.1% | 26,000 |
| Yellow Iron Oxide | 0.6 | 2.7% | 1,520 |
| Phthalocyanine Blue | 0.05 | 0.8% | 2,110,000 |
| Carbon Black | 0.07 | 0.1% | 80,100 |
| Organic Red | 0.3 | 1.2% | 14,900 |

The completed powder can then be applied to a substrate using any conventional method, including spraying, electrostatic spraying, fluidized beds and the like. Following powder application, the substrate is heated to a temperature sufficient to cause the powder particles to melt and flow. Various heating sources may be used, including convection heating, infrared heating, induction heating, or a combination thereof. Optionally, the powder may be applied to a preheated substrate.

Then the coating is optionally cured, and such curing may occur via continued heating, subsequent heating, or residual heat in the substrate. In another embodiment of the invention, if a radiation curable powder coating base is selected, the powder can be melted by a relatively short or low temperature heating cycle, and then may be exposed to radiation to initiate the curing process. One example of this embodiment is a UV-curable powder. Other examples of radiation curing include using UV-Vis, Visible light, near-IR, IR and E-beam.

Preferably, the coated substrate is uniformly colored and has the desirable physical and mechanical properties. Thickness of the final film coating depends upon the desired application of the substrate and the additives selected. Typically, the final film coating will have a thickness of 25 to 200 microns.

Another feature of the current invention is that less colorant may be needed to produce the same color in the final film coating. This may vary depending on the colorant used, but typically about 25% less colorant is required than if the colorant is mixed thoroughly with the film forming resin, such as occurs in the extruder. It is anticipated that this process may better distribute the colorant than the mixing that occurs in the extruder. Additionally, in the current invention, the colorant is at the surface of the particles, rather than being throughout the powder particles. This allows the same amount of colorant at the surface of the final film coating with less colorant being added. Illustratively, when one makes a very thin cut through the final film coating and examines the exposed cut under a microscope, the colorant appears to be distributed at the interface of the coalesced base powder.

The following examples are offered to aid in understanding of the present invention and are not to be construed as limiting the scope thereof. Unless otherwise indicated, all parts and percentages are by weight.

EXAMPLES

Several materials cited in the following examples were evaluated by tests common in the industry. These test results were obtained from manufacturer literature. Epoxide Equivalent Weight measures molecular weight per epoxy group. Acid value measures mg of potassium hydroxide reacted per g of resin.

Example 1

Preparation of Hybrid White Base Powder

TABLE 1

| Ingredient | Parts by weight |
| --- | --- |
| Epoxy Resin (Epon 2002, Epoxide Eqt. Wt. 675–760) | 1380 |
| Polyester Resin (Acid value 75–85) | 1380 |
| Catalyst (Benzyltriethylammonium chloride) | 2.8 |
| Acrylic Flow Control Agent (Modaflow III) | 40 |
| Titanium Dioxide Pigment (R-900) | 800 |
| Calcium Carbonate Filler (Omyacarb UF) | 400 |

The above ingredients were combined and dry blended in a Reos mixer for 20 seconds, then extruded through a Werner-Pfleiderer ZSK-30 extruder. The cooled extrudate was combined with 0.2% by wt. of Degussa Aluminum Oxide C dry flow agent, then ground on an air classifying mill (Powder Process Systems-laboratory model). Aluminum Oxide C was added to help the free-flowing properties of the finished powder. The resulting powder was then sieved through a 230-T mesh Sweco screen. The particle size of the powder was measured on a Malvern Mastersizer 2000 laser particle size analyzer, and found to have a median particle size (d(0.5)) of 30.4 microns. A panel of the product after electrostatic spraying and baking (20 minutes at 190° C.) gave gloss readings of 96 (at 60 degree angle) and 74 (at 20 degree angle).

Example 2

Preparation of Hybrid Clear Base Powder

TABLE 2

| Ingredient | Parts by weight |
| --- | --- |
| Epoxy Resin (Epon 2002) | 1380 |
| Polyester Resin (Acid value 75–85) | 1380 |
| Catalyst (Benzyltriethylammonium chloride) | 2.8 |
| Acrylic Flow Control Agent (Modaflow III) | 40 |
| Calcium Carbonate Filler (Omyacarb UF) | 1200 |

The above ingredients were processed as described in Example 1. The median particle size of the resultant powder was found to be 29.7 microns.

Example 3

Preparation of Thermosetting Polyester White Base Powder

TABLE 3

| Ingredient | Parts by weight |
| --- | --- |
| Polyester Resin (Crylcoat 440, Acid value 30–36) | 2567 |
| Triglycidylisocyanurate Curing Agent | 193 |
| Acrylic Flow Control Agent (Modaflow III) | 40 |
| Titanium Dioxide (R-960) | 800 |
| Barium Sulfate Filler (Bartex 10) | 400 |

The above ingredients were processed as described in Example 1. The median particle size of the resultant powder was found to be 32.8 microns. Panels of the product, after electrostatic spraying and baking for 20 minutes at 190° C., gave gloss readings of 96 (60 degree geometry) and 82 (20 degree geometry).

Example 4

Preparation of Hybrid White Powder

TABLE 4

| Ingredient | Parts by weight |
| --- | --- |
| Polyester Resin (Acid value 70–85) | 1157.5 |
| Epoxy Resin (Epoxide equivalent weight 700) | 1157.5 |
| Catalyst (Benzyltriethylammonium chloride) | 0.75 |
| Acrylic Flow Control Agent (Modaflow III) | 37.5 |
| Wax additive | 53.5 |
| Titanium Dioxide Pigment (R-960) | 1420.0 |
| Calcium carbonate (Omyacarb 3) | 25.0 |
| Conductivity additive (LancoStat 308) | 7.7 |
| Barium titanate | 34.9 |
| Ultramarine blue pigment | 2.4 |
| Carbon black pigment (Raven 450) | 0.2 |
| Red pigment (Hostaperm E3B) | 0.07 |

The above ingredients were combined and dry blended in a Reos mixer for 20 seconds, then extruded through a Werner-Pfleiderer ZSK-30 extruder. The cooled extrudate was combined with 0.15% of Degussa Aluminum Oxide C and ground on a Micropul Bantam mill, and then sieved thought a 145-mesh screen. The median particle size of the resultant powder was found to be 43 microns.

Example 5

Gray Powder 100.0 g of hybrid white base powder (Example 1) was charged to a small pharmaceutical mixer-mill, model DM-6. This device comprises a stainless steel bowl, approximately 11.4 cm in diameter and 5 cm deep, with a threaded removable lid. A single rotating mixing blade is mounted close to the bottom of the bowl. The rotational speed of the blade is 4800 RPM.

Into a separate container were added 2.0 g of Degussa Covon White Colorant Dispersion 832-0001, 1.5 g of Degussa Covon Black Colorant Dispersion 832-9901, and 10.0 g of distilled water. The colorant dispersion blend was premixed by hand with a small spatula until it was a uniform gray color.

The colorant dispersion blend was added to the mixer containing the hybrid white powder and mixed for two separate 10 second cycles. After removing the lid, it was apparent that some unmixed white product was trapped in the threads of the bowl and on the lid surface. The lid and threads were wiped clean, then the product was mixed for an additional 20 seconds. The product appeared uniform in color to the unaided eye, and was a non-free flowing, cohesive powder. The consistency of the product at this point resembled fresh brown sugar.

The product was discharged from the mixer and allowed to dry overnight in an uncovered container at ambient temperature (21° C.). The product was then sieved through a 170-mesh screen. The resultant product was a free-flowing powder, similar in material handling characteristics to the original starting white base powder.

The product was electrostatic sprayed onto a 0.051 cm (0.020 inch) thick cold rolled steel substrate. The product exhibited good spraying characteristics. After curing for 10 minutes at 204° C., the panel had a gloss of 88 (at 60 degree angle) and 48 (at 20 degree angle). The color was not uniform to the unaided eye, and had both white specks and black specks.

Example 6

Gray Powder 75.0 g of hybrid white base powder (Example 1) was charged to the mixer described in Example 5.

Into a separate container were added 4.0 g of Degussa Covon White Colorant Dispersion 832-0001, 0.3 g of Degussa Covon Black Colorant Dispersion 832-9901, and 10.0 g of distilled water. The colorant dispersion blend was premixed by hand with a small spatula until it was a uniform gray color.

The colorant dispersion was added to the mixer containing the hybrid white powder and mixed for 20 seconds. The lid was removed and the lid and threads scraped free of un-mixed product, then the mixing process was repeated for an additional 20 second cycle. The product was allowed to cool briefly, and then mixed for two additional 10 second cycles. The product appeared uniform in color to the unaided eye, and was a damp, cohesive solid, resembling brown sugar in consistency.

The product was discharged from the mixer and allowed to dry for three days in an uncovered container at ambient temperature (21° C.). After drying, the product was sieved through a 170-mesh screen. The resultant product was a free flowing powder, similar in material handling characteristics to the original starting white base.

After spraying and curing, the color was rated as very uniform to the unaided eye. The gloss was 69 (at 60 degree angle) and 22 (at 20 degree angle).

Example 7

Gray Colored Powders

The general procedure described in Example 6 was followed for Example 7, except that the mixing time was four separate 10 second cycles, and the drying time before sieving was overnight (at 21° C.). In the following chart, VG=very good, G=good, F=fair, P=poor. The quantities utilized (parts by weight) are listed below:

TABLE 7

| Ingredient | Run 1 | Run 2 | Run 3 | Run 4 | Run 5 |
| --- | --- | --- | --- | --- | --- |
| Hybrid white base (Example 1) | 75 | 75 | 75 | 75 | 75 |
| Degussa Covon White Colorant Dispersion 832-0001 | 8.0 | 2.0 | 4.0 | 4.0 | 4.0 |
| Degussa Covon Black Colorant Dispersion 832-9901 | 0.2 | 0.2 | 0.12 | 0.3 | 0.3 |
| Distilled Water | 10 | 10 | 10 | 5 | 20 |
| Color Uniformity | VG | G | VG | G | G |
| Gloss (60 degree angle) | 44 | 80 | 71 | 73 | 68 |
| Gloss (20 degree angle) | 9 | 33 | 23 | 26 | 21 |

In order to determine the effect, if any, of the colorants on corrosion resistance, samples of hybrid white base (example 1) and gray colored powder (Example 7 run 5) were applied to Bonderite 1000 panels and subjected to salt spray testing (ASTM B117, test duration 1000 hours) and humidity testing (ASTM D2247, test duration 1000 hours). Results were rated according to ASTM D714 and ASTM D1654.

After 1000 hours salt spray:
Example 1 ratings: blisters=10, rust=10, and creepage=1.5 mm.
Ex. 7 run 5 ratings: blisters=8(few), rust=9, and creepage=1.7 mm. After
1000 hours of humidity:
Example 1 ratings: blisters=10, and rust=10.
Ex. 7 run 5 ratings: blisters=10, and rust=10.

These corrosion resistance test results indicate that the addition of the colorant has only a minor effect on the corrosion resistance of the coating.

Example 8

Gray Powder (Low Intensity Mixing)

75.0 g of hybrid white base powder (Example 1) was charged to a 1 liter polyethylene laboratory beaker which was fitted to a Cole-Parmer electric laboratory mixer model 4554-10, equipped with a 6.35 cm diameter three blade impeller.

Into a separate container were added 4.0 g of Degussa Covon White Colorant Dispersion 832-0001, 0.3 g of Degussa Covon Black Colorant Dispersion 832-9901, and 4.0 g of distilled water. The colorant mixture was stirred to a uniform gray color.

The white base powder was stirred at an impeller speed of 250 RPM, and the colorant dispersion was added under agitation. The colorant initially appeared to settle on the bottom of the container, and it was noted that there were some dead spots around the edges of the container where relatively poor agitation was obtained. These dead spots were stirred periodically by hand with a small spatula. After approximately five minutes of stirring, the color of the product was a visually uniform gray. The dry flow properties of the product at this time were relatively poor. The product was a damp, moderately cohesive solid.

The product was allowed to dry at ambient temperature (21° C.) in the open beaker for approximately four hours. At that time the fluidity of the powder had improved. The product was then transferred to a fluidized bed and aerated with dry air for approximately five minutes, then sieved through a 170 mesh screen, electrostatically sprayed onto 0.051 cm (0.020 inch) cold rolled steel, and baked for 20 minutes at 190° C.

The color uniformity of the panel was rated good. With the unaided eye, no color speckles were readily apparent. Using a hand-held magnifying glass, lighter speckles within a darker color matrix were visible. The gloss was 71 (at 60 degree angle) and 21 (at 20 degree angle).

These results show that low intensity mixing is a viable technique for mixing the colorant.

Example 9

Gray Powder (Reduced Mixing Cycle Time)

75.0 grams of white hybrid base powder (Example 1) was charged to the mixer described in Example 5. A premixed colorant dispersion containing 4.0 g of Degussa Covon White Colorant Dispersion 832-0001, 0.4 g of Degussa Covon Black Colorant Dispersion 832-9901, and 4.0 g of distilled water was added. The temperature of the powder surface was measured with an optical pyrometer before mixing, and found to be 21° C. The mixer was run for 5 seconds, then the lid was removed and the temperature of the contents was re-measured. After 5 seconds of mixing time, the surface temperature of the contents remained 21° C.

The product was discharged from the mixer and allowed to dry overnight in an open container. After sieving (170 mesh), the product was sprayed and cured for 20 minutes at 190° C. The resulting panel had good color uniformity, as no color speckles could be detected with the unaided eye. The gloss of the panel was 70 (at 60 degree angle) and 21 (at 20 degree angle).

Example 10

Mixing Cycle Time and Temperature Effect

The temperature measurement described in Example 9 was repeated using a mixing time of 10 seconds, and a temperature rise from 21° C. initial surface temperature to 24° C. after mixing was measured. The measurement was repeated using a mixing time of 20 seconds, and a temperature rise from 20° C. initial surface temperature to 32° C. after mixing was measured.

The powder of this example is formulated to withstand storage temperatures of 35° C. or greater for periods of several days without undergoing significant sintering. Consequently, it is believed that exposure of the powder to the relatively low temperatures and short times employed in these mixing cycles would not cause significant irreversible agglomeration effects.

Example 11

Evaluation of Alternative Colorant Dispersions

In this Example, alternative aqueous colorant dispersions were evaluated. The following samples were prepared using the same mixer and general technique as described in Example 5, mixing for 5 seconds, wiping down the lid and threads, then mixing for an additional 7 seconds. The resulting mixture was dried overnight at 20-23° C. The following powders were prepared (all weights in grams):

TABLE 11

| Ingredient | Run 1 | Run 2 | Run 3 | Run 4 | Run 5 |
|---|---|---|---|---|---|
| Color | Gray | Beige | Beige | Black | Black |
| Hybrid white base (Example 1) | 75.0 | 75.0 | 75.0 | — | — |
| Hybrid clear base (Example 2) | — | — | — | 75.0 | 75.0 |
| Penncolor White Dispersion 36W1 | 2.0 | | | | |
| Penncolor Black Dispersion 36B484 | 0.6 | | | 5.6 | — |
| EPS/CCA Yellow Oxide Dispersion 8077 | — | 2.0 | 1.5 | — | — |
| EPS/CCA Black Dispersion 8091 | — | 0.3 | 0.2 | — | 5.6 |
| EPS/CCA Red Oxide Dispersion 8035 | — | 0.5 | 0.2 | — | — |
| Distilled Water | 5.0 | 5.0 | 5.0 | 5.0 | 5.0 |
| Color Uniformity | P-mottled, picture framing | G | G | VG | VG |
| Gloss (60 degree angle) | 84 | 98 | 92 | 75 | 55 |
| Gloss (20 degree angle) | 42 | 50 | 42 | 27 | 12 |

This data indicates that EPS/CCA colorant dispersions are capable of giving reasonably high gloss at moderate dosage levels, but produce significant reduction in gloss when used at relatively high dosage levels in a straight black.

Additionally, pill flow tests were conducted on examples 2, 11-4, and 11-5. Pill flow is a measure of the ability of the powder to flow out during the heating/melting stage, and is described in and run according to ASTM D4242-02 Standard Test Method for Inclined Plate Flow for Thermosetting Coating Powders. Comparing the results shows that sample 11-4 had increased pill flow over the base powder, while sample 11-5 had a decreased pill flow. The specific results were:

Example 2 (hybrid clear base)=25 mm
Example 11-4=42 mm
Example 11-5=16 mm

Example 12

Black Powder

For comparison with examples 11-4 and 11-5, a sample utilizing Degussa Covon Black Colorant Dispersion was prepared using similar techniques as Example 11. The material quantities are as follows: Hybrid Clear Base (Example 2) 75.0 g, Degussa Covon Black Colorant Dispersion 832-9901 5.6 g, distilled water 10.0 g. Resultant gloss readings were 41 (at 60 degree angle) and 7 (at 20 degree angle). The pill flow was 16 mm.

The effect of colorant on the sintering resistance of the product was determined by placing samples of example 1 and example 12 in a 40° C. oven for three days. Both examples 1 and 12 were free flowing powders without visible lumping, caking, or sintering after exposure to the test conditions.

Comparison of the results of examples 2, 11, and 12 suggest that Degussa Covon Black and EPS/CCA Black Colorant Dispersions both cause reduction in powder melt flow, as indicated by the decrease in pill flow values versus the untreated base. In contrast, addition of the Penncolor dispersion increased pill flow, but also gave somewhat poorer color uniformity when added to the white base.

Example 13

Various Additional Colored Powders

The same mixing conditions described in example 11 were used to prepare the following additional powders.

TABLE 13

| Ingredient | Run 1 | Run 2 | Run 3 | Run 4 | Run 5 |
|---|---|---|---|---|---|
| Color | Gray | Gray | Violet | Red | Green |
| Hybrid white base (Example 1) | 75.0 | 75.0 | 75.0 | 75.0 | — |
| Hybrid clear base (Example 2) | — | — | — | — | 75.0 |
| Penncolor White Dispersion 36W1 | 2.0 | — | — | — | — |
| Penncolor Black Dispersion 36B484 | 0.6 | 0.6 | — | — | — |
| EPS/CCA Yellow Oxide Dispersion 8077 | — | 2.0 | — | 2.0 | 4.0 |
| Degussa Covon White Dispersion 832-0001 | 2.0 | — | 2.0 | — | — |
| Degussa Covon Violet Dispersion 832-8801 | — | — | (1 drop) | — | — |
| Degussa Covon Napthol Red Dispersion 832-0805 | — | — | — | 3.0 | — |
| Degussa Covon Phthalo Green Dispersion 832-5501 | — | — | — | — | 1.0 |
| Degussa Covon Lightfast Yellow Dispersion 832-2505 | — | — | — | — | 3.0 |
| Distilled Water | 5.0 | 5.0 | 5.0 | 5.0 | 5.0 |
| Color Uniformity | G | G | VG | VG | VG |
| Gloss (at 60 degree angle) | 68 | 94 | 63 | 78 | 75 |
| Gloss (at 20 degree angle) | 22 | 49 | 19 | 30 | 27 |

Example 14

Various Additional Colored Powders

The mixing conditions as described in example 11 were used to prepare the following additional powders.

TABLE 14

| Ingredient | Run 1 | Run 2 | Run 3 | Run 4 | Run 5 |
|---|---|---|---|---|---|
| Color | Beige | Blue | Violet | Violet | Green |
| Hybrid white base (Example 1) | 75.0 | 75.0 | 75.0 | 75.0 | 75.0 |
| EPS/CCA Yellow Oxide Dispersion 8077 | 1.5 | — | — | — | 4.0 |
| EPS/CCA Red Oxide Dispersion 8035 | 0.1 | — | — | — | — |
| EPS/CCA Black Dispersion 8091 | 0.3 | — | — | — | — |
| Degussa Covon White Dispersion 832-0001 | — | 2.0 | 3.0 | — | — |
| Penncolor White Dispersion 36W1 | — | — | — | 3.0 | — |
| Penncolor Black Dispersion 36B484 | — | — | — | — | 0.2 |
| Penncolor Blue Dispersion 36S14 | — | 3.0 | — | — | — |
| Degussa Covon Violet Dispersion 832-8801 | — | — | 2.0 | 2.0 | — |
| Degussa Covon Phthalo Green Dispersion 832-5501 | — | — | — | — | 2.5 |
| Distilled Water | 5.0 | — | 5.0 | 4.0 | 4.0 |
| Color Uniformity | VG | G | VG | VG | G |
| Gloss (at 60 degree angle) | 92 | 75 | 73 | 79 | 80 |
| Gloss (at 20 degree angle) | 45 | 27 | 23 | 28 | 30 |

A sample of example 14 run 1 was spread out with a spatula on a cold rolled steel panel on a heated 180° C. gel plate. The molten mass was stirred with the spatula, and the panel was then cooled. It was observed that the color obtained from stirring the product was much lighter than the color obtained from a panel that had been electrostatically sprayed and cured in the oven. This result suggests that a given color shade may be reached using less colored pigment by adding the colorant to the powder surface than would be required if the colorants were fully melt-mixed with the resin base.

Example 15

Additional Colors Using Clear Base

Using the mixing conditions described in example 11, the following colors were produced. In table 15, the appearance ratings for straight-shade (non-metallic) finishes refer to color uniformity, and appearance ratings for metallic and pearlescent finishes refer to general overall esthetic appearance.

TABLE 15

| Ingredient | Run 1 | Run 2 | Run 3 | Run 4 | Run 5 |
|---|---|---|---|---|---|
| Color | Green Metallic | Violet Metallic | Blue | Pearlescent Red | Blue Metallic |
| Hybrid clear base (Example 2) | 75.0 | 75.0 | 75.0 | 75.0 | 75.0 |

TABLE 15-continued

| Ingredient | Run 1 | Run 2 | Run 3 | Run 4 | Run 5 |
|---|---|---|---|---|---|
| Degussa Covon Phthalo Green Dispersion 832-5501 | 1.1 | — | — | — | — |
| M D Both Powdall 3400 treated aluminum flake | 1.4 | 2.0 | — | — | — |
| Degussa Covon Violet Dispersion 832-8801 | — | 2.0 | — | — | — |
| Penncolor Black Dispersion 36B484 | 0.1 | — | — | 3.0 | — |
| Degussa Covon White Dispersion 832-0001 | — | — | 1.0 | — | — |
| Penncolor Blue Dispersion 36S14 | — | — | 6.0 | — | — |
| Penncolor Blue Dispersion 30S463 | — | — | — | — | 0.2 |
| EMS Afflair Pearlescent Red 7215 | — | — | — | 2.0 | — |
| Eckert Dorolon 17/0 treated pale bronze flake | — | — | — | — | 3.0 |
| Distilled Water | 3.0 | 3.0 | 3.0 | 3.0 | 5.0 |
| Appearance | G | G | G-VG | VG | G |
| Gloss (at 60 degree angle) | 81 | 74 | 83 | 76 | 79 |
| Gloss (at 20 degree angle) | 38 | 30 | 32 | 34 | 30 |

Example 16

Colored Powder Using Dye 100 g of distilled water was heated to 80° C. and 1.6 g of Transfast black water soluble dye #3280 (marketed by Homestead Finishing Products, Cleveland, Ohio) was added with magnetic stirring. The solution was stirred until the dye was visually dissolved.

After cooling to 21° C., the dye solution was added to the base powder using the same mixer and procedure as described in example 11. The quantities of materials used are as follows (all weights in grams).

TABLE 16

| Ingredient | Run 1 | Run 2 | Run 3 |
|---|---|---|---|
| Hybrid white base (Example 1) | 75.0 | 75.0 | 75.0 |
| Dye solution | 5.0 | 5.0 | 15.0 |
| Penncolor White Dispersion 36W1 | 2.0 | — | — |
| Color uniformity | F–G | F–G | F–G |
| Gloss (at 60 degree angle) | 88 | 94 | 89 |
| Gloss (at 20 degree angle) | 50 | 61 | 44 |

Example 17

Use of Solid Pigment Dispersions

To a mixture of 45.0 g of VM&P naphtha and 5.0 g of isopropanol was added 2.0 g of Sun Pigments 649GP49 pigment dispersion. Sun Pigments 649GP49 is described as a pre-dispersed solid pigment concentrate comprising 60% phthalo blue pigment and 40% Laropal A81 aldehyde resin. The mixture was stirred until it appeared to be visually free of undissolved solids. An 11.7 g portion of this mixture was added to 100 g of white powder (Example 4). The resultant mixture was stirred in a fume hood using a laboratory stirring motor equipped with a propeller agitator. The product was allowed to dry overnight in the fume hood.

After drying, the product was observed to contain many hard lumps that were somewhat difficult to break up with hand stirring with a spatula. The product was sieved (170 mesh), sprayed, and baked 20 minutes at 190° C. The appearance of the resulting panels was rated fair, with traces of speckles visible to the unaided eye.

Example 18

Evaluation of Alternative Aqueous Pigment Dispersions

In example 18, two commercially available aqueous pigment dispersions (Degussa 870 series and Degussa 895 series) were compared to the Covon 832 series dispersions (used in previous examples). The comparison was performed using a TGIC polyester base powder (Example 3). The mixing device described in example 5 was used to process the following samples. Mixing time was 5 seconds, followed by wiping down the lid and threads, followed by an additional 5 second mixing time. Drying time was overnight at 20° C. The dried product was sieved (170 mesh), sprayed, and baked 20 minutes at 190° C. The quantities of ingredients are as follows (all weights in grams):

TABLE 18

| Ingredient | Run 1 | Run 2 | Run 3 |
|---|---|---|---|
| Color | Gray | Gray | Gray |
| TGIC white base (Example 3) | 75.0 | 75.0 | 75.0 |
| Degussa White Pigment Dispersion 870-0018 | 4.0 | — | — |
| Degussa Black Pigment Dispersion 870-9907 | 0.4 | — | — |
| Degussa White Pigment Dispersion 895-0005 | — | 4.0 | — |
| Degussa Black Pigment Dispersion 895-9905 | — | 0.4 | — |
| Degussa Covon White Dispersion 832-0001 | — | — | 4.0 |
| Degussa Covon Black Dispersion 832-9901 | — | — | 0.4 |
| Distilled Water | 4.0 | 4.0 | 4.0 |
| Color uniformity | VG | VG | VG |
| Gloss (at 60 degree angle) | 99 | 105 | 76 |
| Gloss (at 20 degree angle) | 71 | 81 | 26 |

Particularly noteworthy is the improved 20 degree gloss results obtained from the 870 and 895 dispersions compared to the 832 series. Especially noteworthy is that this improvement in gloss was obtained without sacrifice of color uniformity.

Samples of the powders of examples 3, 18-1, 18-2, and 18-3 were subjected to the sintering resistance test as previously described in example 12. After three days at 40° C., examples 18-1 and 18-2 were both badly sintered into a single lump that did not break up readily, while examples 3 and 18-3 were both free flowing powders without lumping or caking. These sintering resistance results for examples 18-1 and 18-2 show these powders might require extra care in transport and storage. Furthermore, these results taken together also show that a mixture of colorant dispersions might be most effective in obtaining optimal performance characteristics in the powders. It is anticipated that a mix of colorant dispersions would provide both good gloss results and good sintering results.

Example 19

Use of Improved Mixing Process

A Reos mixer equipped with variable speed drive capability was used to mix the colorant dispersions with the powder bases. The Reos mixer comprises portable and interchangeable mixing containers that are fitted to a motor driven impeller unit. The clearances obtained between the impeller and the bottom and sides of the container are tight enough to provide good mixing of solids. The portable containers and mixing impeller are relatively easy to clean between batches. The variable speed control also allows selection of impeller rotational speed to be optimized for the process.

A second batch of hybrid white base powder was prepared using the same techniques and equipment as described in example 1. Although identical in every other known respect to the first batch of powder described in example 1, the second batch was found to have a median particle size (d(0.5)) of 28.4 microns.

53.3 g of Degussa Covon White Colorant Dispersion 832-0001, 5.3 g of Degussa Covon Black Colorant Dispersion 832-9901, and 67.0 g of distilled water were combined and stirred with a spatula until a visually uniform color was obtained. This colorant dispersion was added to 1000 g of hybrid white base powder (second batch of the formula of example 1, as described above) in a Reos mixing container. The initial surface temperature of the mixture was 20° C. (as measured by optical pyrometer). The mixture was agitated using an impeller speed of 800 RPM for 20 seconds. The immediate surface temperature of the product after mixing was measured as 23° C. The product under the impeller and the sides of the mixing vessel was scraped down with a spatula. The mixing vessel and contents were replaced onto the mixer, and the surface temperature was found to be 21 C. The product was mixed for one additional 20 second cycle at 800 RPM. The surface temperature of the product after mixing was 23° C.

The product was allowed to dry in an open mixing vessel overnight. After sieving (170 mesh), the product was found to have a median particle size (d(0.5)) of 31.0 microns. The powder was then sprayed and baked 20 minutes at 190° C. The resulting panels were rated as very good for uniformity of appearance, with no color speckles visible to the unaided eye, and only minimal speckles visible with hand magnification. The gloss of the panels was 73 (at 60 degree angle) and 23 (at 20 degree angle).

Example 20

Processing in a Disposable Shipping Container 1000.0 g of white base powder (Example 3) was charged to a small disposable fiberboard drum, manufactured by Grief Brothers.

15.0 g of Degussa Covon White Pigment Dispersion 832-0001, 1.6 g of Degussa Covon Black Pigment Dispersion 832-9901, and 50.0 g of distilled water were combined and premixed. This colorant dispersion was added to the powder described above and the resultant mixture of components was mixed on the Reos mixer described in example 19. After a mixing cycle of 20 seconds at 800 RPM agitator speed, the container walls and bottom were scraped down by hand with a spatula, and then the container was mixed for an additional 20 seconds at 800 RPM. The container walls and bottom were scraped down again, and an additional 20 seconds at 800 RPM mixing cycle was carried out.

The resulting product was allowed to dry overnight in the uncovered disposable shipping container at 20° C., and saved for future use.

Example 21

Use of Flatting Pigment Dispersion 15.0 g of Modaflow AQ-3025 (from UCB Surface Specialties) and 185.0 g of distilled water were stirred with a laboratory air powered stirrer equipped with a 75 mm diameter agitator blade. 500 g of Minex 4 pigment (from Indusmin) was then added under agitation. The mixture was stirred at maximum speed until a Hegman gauge reading of #4-#5 was obtained. The Modaflow-Minex mixture was poured into a plastic sealable container for later use.

2.5 grams of Degussa Covon Red Calcium 2B colorant dispersion 832-0501, 0.1 g of Degussa Covon Carbazole Violet colorant dispersion 832-8801, 2.0 g of Powdall 3400 aluminum flake (from MD Both), and 3.0 g of distilled water were combined and premixed until uniform in appearance. The premixed colorant dispersion was added to 75.0 g of hybrid clear base (from example 5) in the mixer. After processing as described in example 11, the resulting panels had good metallic appearance and gloss of 65 (at 60 degree angle) and 20 (at 20 degree angle).

A second colorant premix was prepared from 2.5 g of Degussa Covon Red calcium 2B colorant dispersion 832-0501, 0.1 g of Degussa Covon Carbazole violet colorant dispersion 832-8801, 2.0 g of Powdall 3400 aluminum flake (from MD Both), 5.0 g of the Modaflow-Minex mixture described above in this example, and 5.0 g of distilled water. After processing as described above, the resulting panels had gloss 55 (at 60 degree angle) and 15 (at 20 degree angle). The appearance was good with respect to metallic appearance, but suffered from significant seeds on the surface.

The Modaflow-Minex mixture described above was stirred with a spatula, and it was noted that a significant amount hard settling of the pigment was present in the bottom of the container. This settling suggests that the stability of this pigment dispersion may be inadequate, and that an alternative dispersing aid is needed.

Example 22

Evaluation of Alternative Aqueous Pigment Dispersions

Using the mixing device and mixing times described in example 18, two additional samples were prepared from aqueous pigment dispersions supplied by Sun Chemical Corporation. The drying time was 3 days at 20° C. The dried product was sieved (170 mesh), sprayed, and baked 20 minutes at 190° C. The quantities of ingredients are as follows (all weights in grams):

TABLE 22

| Ingredient | Run 1 | Run 2 |
|---|---|---|
| Color | Gray | Gray |
| TGIC white base (Example 3) | 75.0 | 75.0 |
| Sun Chemical White Pigment Dispersion Sunsperse WHD-9507 | 4.0 | — |
| Sun Chemical Black Pigment Dispersion Sunsperse LHD-9303 | 0.5 | — |
| Sun Chemical White Pigment Dispersion Flexiverse WFD-5006 | — | 4.0 |
| Sun Chemical Black Pigment Dispersion Flexiverse LFD-4343 | — | 0.4 |
| Distilled Water | 5.0 | 5.0 |
| Color uniformity | VG | VG |
| Gloss (at 60 degree angle) | 91 | 79 |
| Gloss (at 20 degree angle) | 58 | 32 |

Samples of the powder coatings were subjected to the sintering resistance test as previously described in Example 18. After 3 days at 40° C., both examples 22-1 and 22-2 were free flowing powders without lumping or caking.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A method, comprising:
   extruding a base powder mixture to form a base powder with a particle size of 10 to 300 microns, wherein the base powder mixture comprises a carboxyl-functional polyester resin curable with an epoxide-functional compound;
   mixing said base powder with at least one stable colorant dispersion below about 40° C. to form a colored mixture in which particles of the base powder are coated with a colorant and there is a minimal change in the particle size of the base powder particles, wherein the stable colorant dispersion consists of at least one of a pigment and a dye in a liquid carrier, wherein the liquid carrier is selected from water, organic solvents and combinations thereof, and wherein the liquid carrier does not cause melting or softening of the base powder, and wherein the pigment is selected from organic pigments with a median particle size of less than 0.3 microns, titanium dioxide pigments with a median particle size of 0.3 to 0.5 microns, iron oxide pigments with a median particle size of 0.2 to 0.6 microns, carbon black pigments with a median particle size of about 0.07 microns, and phthalocyanine blue pigments with a median particle size of about 0.05 microns; and
   treating the colored mixture at temperatures below the softening point of the base powder to form a free flowing powder.

2. The method of claim 1, wherein the base powder and the colorant dispersion are mixed for about 1 minute.

3. The method of claim 1 wherein said liquid carrier is water.

4. The method of claim 1, wherein the base powder mixture further comprises a colorant, wherein the colorant is a titanium white pigment.

5. The method of claim 1, wherein said base powder comprises particles with a median particle size of about 10 to about 60 microns in diameter.

6. A method, comprising:
   extruding a base powder mixture to form a base powder with a particle size of 10 to 300 microns, wherein the base powder mixture comprises a carboxyl-functional polyester resin curable with an epoxide-functional compound;
   mixing said base powder(s) with at least one stable colorant dispersion below about 40° C. to form a colored mixture in which particles of the base powder are coated with a colorant and there is a minimal change in the particle size of the base powder particles, wherein each dispersion consists of one of:
   (a) a pigment selected from organic pigments with a median particle size of less than 0.3 microns, titanium dioxide pigments with a median particle size of 0.3 to 0.5 microns, iron oxide pigments with a median particle size of 0.2 to 0.6 microns, carbon black pigments with a median particle size of about 0.07 microns, and phthalocyanine blue pigments with a median particle size of about 0.05 microns;
   a liquid carrier, wherein the liquid carrier is selected from water, organic solvents and combinations thereof, and wherein the liquid carrier does not cause melting or softening of the base powder; and
   a dispersing aid, wherein said dispersing aid is soluble in the carrier and is selected from the group consisting of surfactants and monomers that maintain the stability of the dispersion; or
   (b) a dye in a liquid carrier;
   and
   treating the colored mixture at temperatures below the softening point of the base powder to form a free flowing powder.

7. A method of powder coating, comprising:
   extruding a base powder mixture to form a base powder with a particle size of 10 to 300 microns, wherein the base powder mixture comprises a carboxyl-functional polyester resin curable with an epoxide-functional compound;
   mixing the base powder(s) and at least one stable colorant dispersion below about 40° C. to form a colored mixture in which particles of the base powder are coated with a colorant and there is a minimal change in the particle size of the base powder particles, wherein the stable colorant dispersion consists of at least one of a pigment and a dye in a liquid carrier, wherein the liquid carrier is selected from water, organic solvents and combinations thereof, and wherein the liquid carrier does not cause melting or softening of the base powder, and wherein the pigment is selected from organic pigments with a median particle size of less than 0.3 microns, titanium dioxide pigments with a median particle size of 0.3 to 0.5 microns, iron oxide pigments with a median particle size of 0.2 to 0.6 microns, carbon black pigments with a median particle size of about 0.07 microns, and phthalocyanine blue pigments with a median particle size of about 0.05 microns;

treating the colored mixture at temperatures below the softening point of the base powder to form a free flowing colored powder;

applying the colored powder to a substrate; and heating the colored powder to form a powder coating on the substrate.

8. The method of claim 7, wherein the carrier is water.

9. The method of claim 6, wherein the base powder mixture further comprises a colorant.

10. The method of claim 7, wherein the base powder mixture further comprises a colorant.

11. The method of claim 10, wherein the colorant is titanium dioxide white.

12. The method of claim 10, wherein the liquid carrier is water.

* * * * *